(12) United States Patent
Turkoglu

(10) Patent No.: US 11,496,583 B2
(45) Date of Patent: *Nov. 8, 2022

(54) SYSTEM AND METHOD FOR ORDERING MEDIA CONTENT FOR SHUFFLED PLAYBACK BASED ON USER PREFERENCE

(71) Applicant: SPOTIFY AB, Stockholm (SE)

(72) Inventor: Deniz Turkoglu, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/807,859

(22) Filed: Mar. 3, 2020

(65) Prior Publication Data

US 2021/0029215 A1    Jan. 28, 2021

Related U.S. Application Data

(63) Continuation of application No. 15/016,078, filed on Feb. 4, 2016, now Pat. No. 10,623,518.

(51) Int. Cl.
| | | |
|---|---|---|
| *G06F 15/16* | (2006.01) | |
| *H04L 67/306* | (2022.01) | |
| *H04L 67/04* | (2022.01) | |
| *H04L 67/01* | (2022.01) | |
| *H04L 67/63* | (2022.01) | |
| *H04L 67/50* | (2022.01) | |
| *H04L 67/561* | (2022.01) | |

(52) U.S. Cl.
CPC ............ *H04L 67/306* (2013.01); *H04L 67/01* (2022.05); *H04L 67/04* (2013.01); *H04L 67/535* (2022.05); *H04L 67/561* (2022.05); *H04L 67/63* (2022.05)

(58) Field of Classification Search
CPC ....... H04L 67/306; H04L 67/04; H04L 67/42; H04L 67/2804; H04L 67/22; H04L 67/327
See application file for complete search history.

(56) References Cited

U.S. PATENT DOCUMENTS

| | | |
|---|---|---|
| 7,840,986 B2 | 11/2010 | Ali |
| 10,623,518 B2 | 4/2020 | Turkoglu |

(Continued)

OTHER PUBLICATIONS

Amazon, "Play Music with Alexa Using Your Voice", retrieved from https://www.amazon.com/gp/help/customer/display.html?nodeId=GNQ59GMNBGBU3U8L on May 10, 2021, 2 pages.

(Continued)

*Primary Examiner* — Padma Mundur
(74) *Attorney, Agent, or Firm* — Tucker Ellis LLP

(57) ABSTRACT

In accordance with an embodiment, described herein is a system and method for providing media content to a media playback device that includes a media server. In response to the initiation by a user of the media playback device to provide media content in shuffle mode, the media server determines a set of media content items based on a context of the initiation. The media server then determines whether a preference profile exists for the user that includes one or more media content items from the set of media content items. If the preference profile exists, the media server orders the one or more media content items from the set of media content items for insertion into a queue according to the preference profile. Thereafter, a remainder of the set of media content items is ordered for insertion into the queue according to rules.

20 Claims, 13 Drawing Sheets

(56) References Cited

U.S. PATENT DOCUMENTS

| | | | |
|---|---|---|---|
| 2002/0199186 A1 | 12/2002 | Ali | |
| 2006/0195462 A1* | 8/2006 | Rogers | H04N 21/4126 |
| 2006/0212444 A1* | 9/2006 | Handman | G11B 27/105 |
| 2007/0025194 A1* | 2/2007 | Morse | G06F 16/9535 |
| | | | 369/30.1 |
| 2008/0263098 A1* | 10/2008 | Kindig | H04L 67/10 |
| 2010/0030772 A1* | 2/2010 | Zilca | G06Q 50/01 |
| | | | 705/319 |
| 2015/0373385 A1* | 12/2015 | Straub | H04N 21/23424 |
| | | | 725/34 |
| 2017/0230438 A1 | 8/2017 | Turkoglu | |

OTHER PUBLICATIONS

Apple Support, "See recommended music on iPhone", iPhone User Guide, retrieved from https://support.apple.com/guide/iphone/get-personalized-recommendations-iph2b1748696/ios on May 10, 2021, 3 pages.

Apple Support, "Use Genius Shuffle, Genius Playlists, or Genius Mixes on iTunes on Mac", iTunes User Guide, retrieved from https://support.apple.com/guide/itunes/use-itunes-guide-itns22073/mac on May 10, 2021, 2 pages.

Pandora, "How to use Pandora from an iOS device", retrieved from https://help.pandora.com/s/article/How-to-use-Pandora-on-iOS?language=en_US on May 10, 2021, 6 pages.

Pandora, "Playlists on Pandora", retrieved from https://help.pandora.com/s/article/Playlists-on-Premium 1519949304429?language-en_US on May 10, 2021, 5 pages.

Pandora, "Shuffle on Pandora", retrieved from https://help.pandora.com/s/article/Shuffle-on-Pandora?language=en_US on May 10, 2021, 3 pages.

Writtenhouse, Sandy; "How to Manage Your Amazon Music Playlists", MUO, published on Jan. 17, 2019, retrieved from https://www.makeuseof.com/tag/amazon-music-playlists/ on May 10, 2021, 25 pages.

* cited by examiner

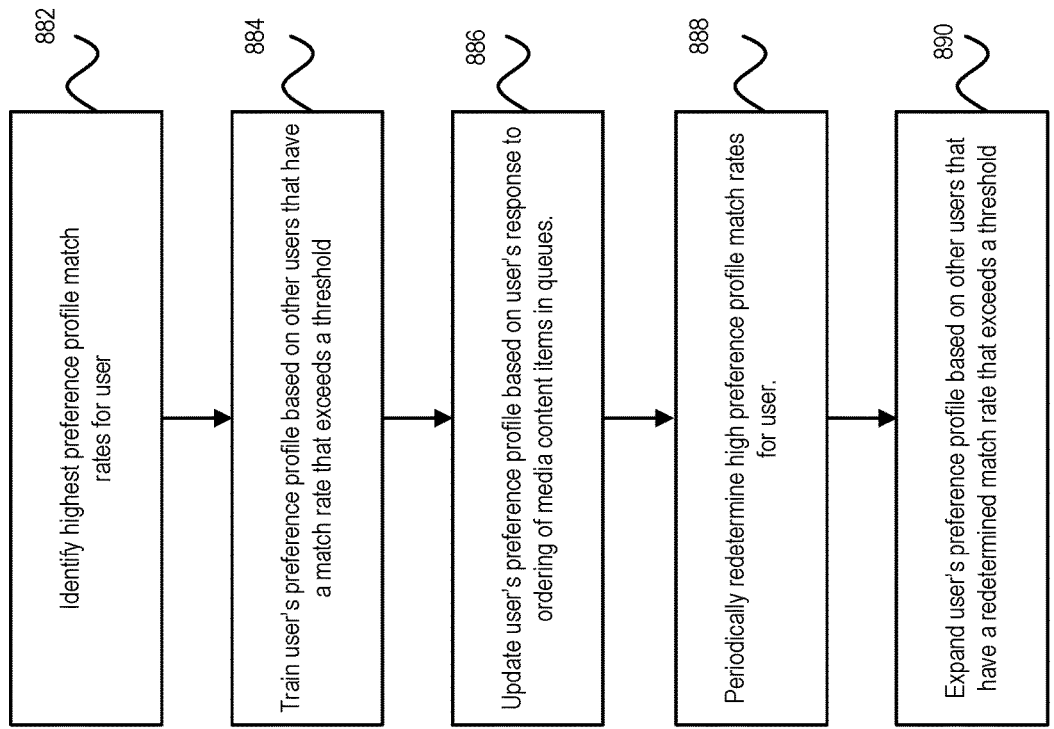

SYSTEM AND METHOD FOR ORDERING MEDIA CONTENT FOR SHUFFLED PLAYBACK BASED ON USER PREFERENCE

CLAIM OF PRIORITY

This application is a continuation of and claims the benefit of priority to U.S. patent application titled "SYSTEM AND METHOD FOR ORDERING MEDIA CONTENT FOR SHUFFLED PLAYBACK BASED ON USER PREFERENCE", application Ser. No. 15/016,078, filed Feb. 4, 2016; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to providing media content. In particular, embodiments of the invention are related to systems and methods for ordering media content to be provided to a requester of media content.

BACKGROUND

Today's consumers enjoy the ability to access a tremendous amount of digital media content, such as music and videos, at any location or time of day, using a wide variety of media devices, including desktops, laptops, dedicated media players, smartphones, etc.

Media content can be provided to requesters based on a variety of service models. For example, some commercial media streaming services allow users to browse or search media content by artist, album, genre, playlist, or record label. Other services operate using a model analogous to radio, creating random playlists of songs chosen based on specified genres, decades, artists, etc. For example, an artist radio feature can create a random playlist of songs by artists related to (and including) a selected artist, and/or within a certain genre.

With any service model, a service provider can improve loyalty and continued subscription or use by providing a satisfying experience to a user. One way to provide a satisfying experience is for the service provider to anticipate and deliver media content that a user will likely enjoy and/or limit the delivery of media content that the user will not enjoy. If a user is requesting a specific album or song, the service provider can easily satisfy the user's request and deliver the desired content. However, if a user is requesting a playlist, or requesting a model analogous to radio, delivering desirable content can be more challenging.

SUMMARY

In accordance with an embodiment, described herein is a system and method for providing media content to a media playback device that includes a media server operating on one or more processors and a memory storing computer program code for ordering the media content. In response to initiation by a user of the media playback device to provide media content in shuffle mode, the media server determines a set of media content items based on a context of the initiation. The media server then determines whether a preference profile exists for the user that includes one or more media content items from the set of media content items. If the preference profile exists, the media server orders the one or more media content items from the set of media content items for insertion into a queue according to the preference profile. Thereafter, a remainder of the set of media content items is ordered for insertion into the queue according to a set of rules. If the preference profile does not exist, the media server orders the set of media content items for insertion into the queue according to the set of rules.

BRIEF DESCRIPTION OF THE FIGURES

These and other aspects, features and advantages will be apparent and elucidated from the following description of various embodiments, reference being made to the accompanying drawings, in which:

FIG. 8A illustrates exemplary data for use with for a method of building a preference profile for a user, in accordance with an embodiment.

FIG. 8B is a flowchart and sample match list for a method of building a preference profile for a user, in accordance with an embodiment.

DETAILED DESCRIPTION

Figure 1:
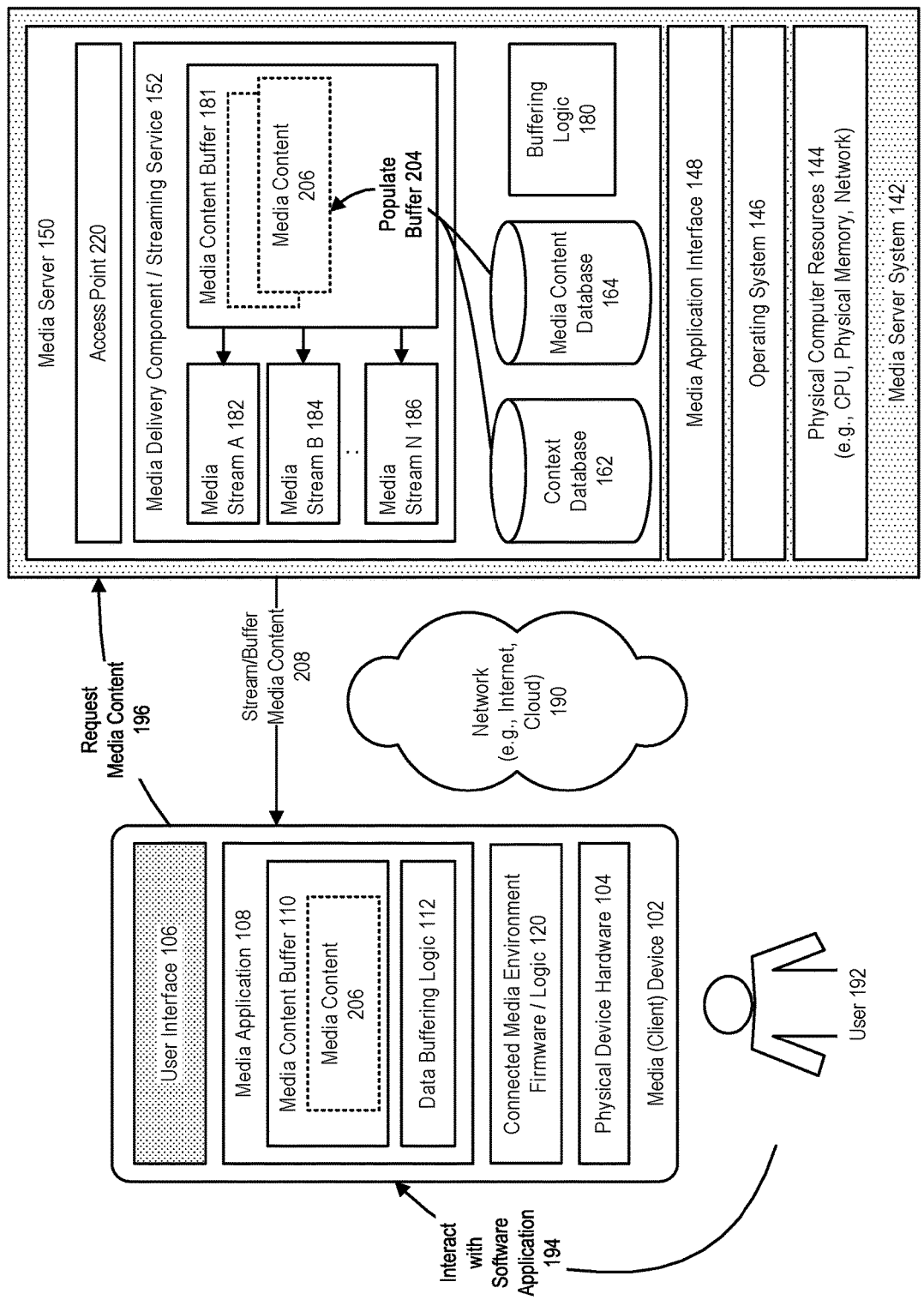
FIG. 1 illustrates an example of a system for providing media content, in accordance with an embodiment.

Embodiments will now be described more fully hereinafter. Embodiments can comprise many different forms and should not be construed as limited to those set forth herein; rather, these embodiments are provided by way of example so that this disclosure will be thorough and complete, and will fully convey the scope of the invention to those persons skilled in the art. Like reference numbers refer to like elements or method steps throughout the description.

In accordance with an embodiment, described herein is a system and method for providing media content to a media playback device that includes a media server operating on one or more processors and a memory storing computer program code for ordering the media content. In response to initiation by a user of the media playback device to provide media content in shuffle mode, the media server determines a set of media content items based on a context of the initiation. The media server then determines whether a preference profile exists for the user that includes one or more media content items from the set of media content items. If the preference profile exists, the media server orders the one or more media content items from the set of media content items for insertion into a queue according to the preference profile. Thereafter, a remainder of the set of media content items is ordered for insertion into the queue according to a set of rules. If the preference profile does not exist, the media server orders the set of media content items for insertion into the queue according to the set of rules.

Further, if the preference profile does not exist, either the media playback device or the media server is prompted to create the preference profile for the user starting with an initial media content item inserted into the queue. The preference profile for the user is then updated based on progression through the queue. The progression can be affected, for example, by interaction of the user with the media playback device to alter the ordering of the set of media content items in the queue and/or inaction of the user to alter the ordering of the set of media content items in the queue.

In accordance with an embodiment, the preference profile pairs media content items from the one or more media content items in a positive or negative relationship with other media content items for which pairing data is available. Ordering the one or more media content items includes arranging the one or more media content items consecutively within the queue in preference to positive relationships. The progression through the queue can be affected by interaction of the user with the media playback device to alter the ordering of the set of media content items in the queue including advancing from a current media content item to a next media content item within a predefined period of time of playing the current media content item. Advancing to the next media content item creates a negative relationship between the current media content item and a preceding media content item that was played to completion in the preference profile. Inaction of the user to alter the ordering of the set of media content items in the queue can create a positive relationship between the current media content item and the preceding media content item that was played to completion in the preference profile.

In accordance with an embodiment, each of the one or more media content items included in the preference profile is inserted once into the queue. Ordering the one or more media content items includes selecting a succeeding media content item randomly from any of the one or more media content items not previously inserted into the queue that has a positive relationship with a preceding media content item until all positive relationships are exhausted.

In accordance with an embodiment, the preference profile can be stored on the media playback device, and the media server obtains the preference profile from the media playback device. Alternatively, the preference profile is stored on the media server. In a further embodiment, the preference profile can be stored on the media playback device and periodically pushed to the media server for storage and the media server determines whether the preference profile is stored on the media server at the time of initiation to provide media content matches the preference profile from the media playback device.

In accordance with an embodiment, the media server compares the preference profile for the user to preference profiles for other users. The media server then determines a preference profile for those other users that match the preference profile within a threshold limit. The preference profile for the user can then be expanded or trained by adding relationships based on the preference profile for the one or more of the other users.

Media Content Environment

FIG. 1 illustrates an example of a system for providing media content, in accordance with an embodiment.

As illustrated in FIG. 1, in accordance with an embodiment, a media device 102, operating as a client device, can receive and play media content provided by a backend media server system 142 (media server), or by another system or peer device. In accordance with an embodiment, the client device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the client device and the media server can include, respectively, one or more physical device or computer hardware resources 104, 144, such as one or more processors (CPU), physical memory, network components, or other types of hardware resources.

Although, for purposes of illustration, a single client device and media server are shown, in accordance with an embodiment a media server can support the simultaneous use of a plurality of client devices. Similarly, in accordance with an embodiment, a client device can access media content provided by a plurality of media servers, or switch between different media streams produced by one or more media servers.

In accordance with an embodiment, the client device can optionally include a user interface 106, which is adapted to display media options, for example as an array of media tiles, thumbnails, or other format, and to determine a user interaction or input. Selecting a particular media option, for example a particular media tile or thumbnail, can be used as a command by a user and/or the client device, to the media server, to download, stream or otherwise access a corresponding particular media content item or stream of media content.

In accordance with an embodiment, the client device can also include a media application 108, together with an in-memory client-side media content buffer 110, and a data buffering logic 112, which can be used to control the playback of media content received from the media server, for playing either at a requesting client device (i.e., controlling device) or at a controlled client device (i.e., controlled device), in the manner of a remote control. A connected media environment firmware/logic 120 enables the device to participate within a connected media environment.

In accordance with an embodiment, the data buffering logic, together with the media content buffer, enables a portion of media content items, or samples thereof, to be pre-buffered at a client device. For example, while media options are being prepared for display on a user interface, e.g., as media tiles or thumbnails, their related media content can be pre-buffered at the same time, and cached by one or more client devices in their media content buffers, for prompt and efficient playback when required.

In accordance with an embodiment, the media server system can include an operating system 146 or other processing environment which supports execution of a media server 150 that can be used, for example, to stream music, video, or other forms of media content to a client device, or to a controlled device.

In accordance with an embodiment, the media server can provide a subscription-based media streaming service, for which a client device or user can have an associated account and credentials, and which enable the user's client device to communicate with and receive content from the media server. A received media-access request from a client device can include information such as, for example, a network address, which identifies a destination client device to which the media server should stream or otherwise provide media content, in response to processing the media-access request.

For example, a user may own several client devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling client device, and their audio speaker as a controlled client device to which media content should be sent. The media server can then send the requested media and/or forward the media-access request to the audio speaker, even though the request originated at the user's smartphone.

In accordance with an embodiment, a media application interface 148 can receive requests from client devices, or from other systems, to retrieve media content from the media server. A context database 162 can store data associated with the presentation of media content by a client device, including, for example, a current position within a media stream that is being presented by the client device, or a playlist associated with the media stream, or one or more previously-indicated user playback preferences. The media server can transmit context information associated with a media stream to a client device that is presenting that stream, so that the context information can be used by the client device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination client device to which the media content is being streamed changes, from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client devices to search within repositories of media content, to locate particular media content items.

In accordance with an embodiment, a buffering logic 180 can be used to retrieve or otherwise access media content items, in response to requests from client devices or other systems, and to populate a server-side media content buffer 181, at a media delivery component/streaming service 152, with streams 182, 184, 186 of corresponding media content data, which can then be returned to the requesting device or to a controlled device.

In accordance with an embodiment, a plurality of client devices, media server systems, and/or controlled devices, can communicate with one another using a network, for example the Internet 190, a local area network, peer-to-peer connection, wireless or cellular network, or other form of network. For example, a user 192 can interact 194 with the user interface at a client device, and issue requests to access media content, for example the playing of a selected music or video item at their client device or at a controlled device, or the streaming of a media channel or video stream to their client device or to a controlled device.

In accordance with an embodiment, the user's selection of a particular media option can be communicated 196 to the media server, via the server's media application interface. The media server can populate its media content buffer at the server 204, with corresponding media content, 206 including one or more streams of media content data, and can then communicate 208 the selected media content to the user's client device, or to the controlled device as appropriate, where it can be buffered in a media content buffer for playing at the device.

In accordance with an embodiment, and as further described below, the system can include a server-side media gateway or access point 220, or other process or component, which operates as a load balancer in providing access to one or more servers, for use in processing requests at those servers. The system can enable communication between a client device and a server via an access point at the server, and optionally the use of one or more routers, to allow requests from the client device to be processed either at that server and/or at other servers.

For example, in a Spotify media content environment, most Spotify clients connect to various Spotify back-end processes via a Spotify "accesspoint", which forwards client requests to other servers, such as sending one or more metadataproxy requests to one of several metadataproxy machines on behalf of the client or end user.

Figure 2:
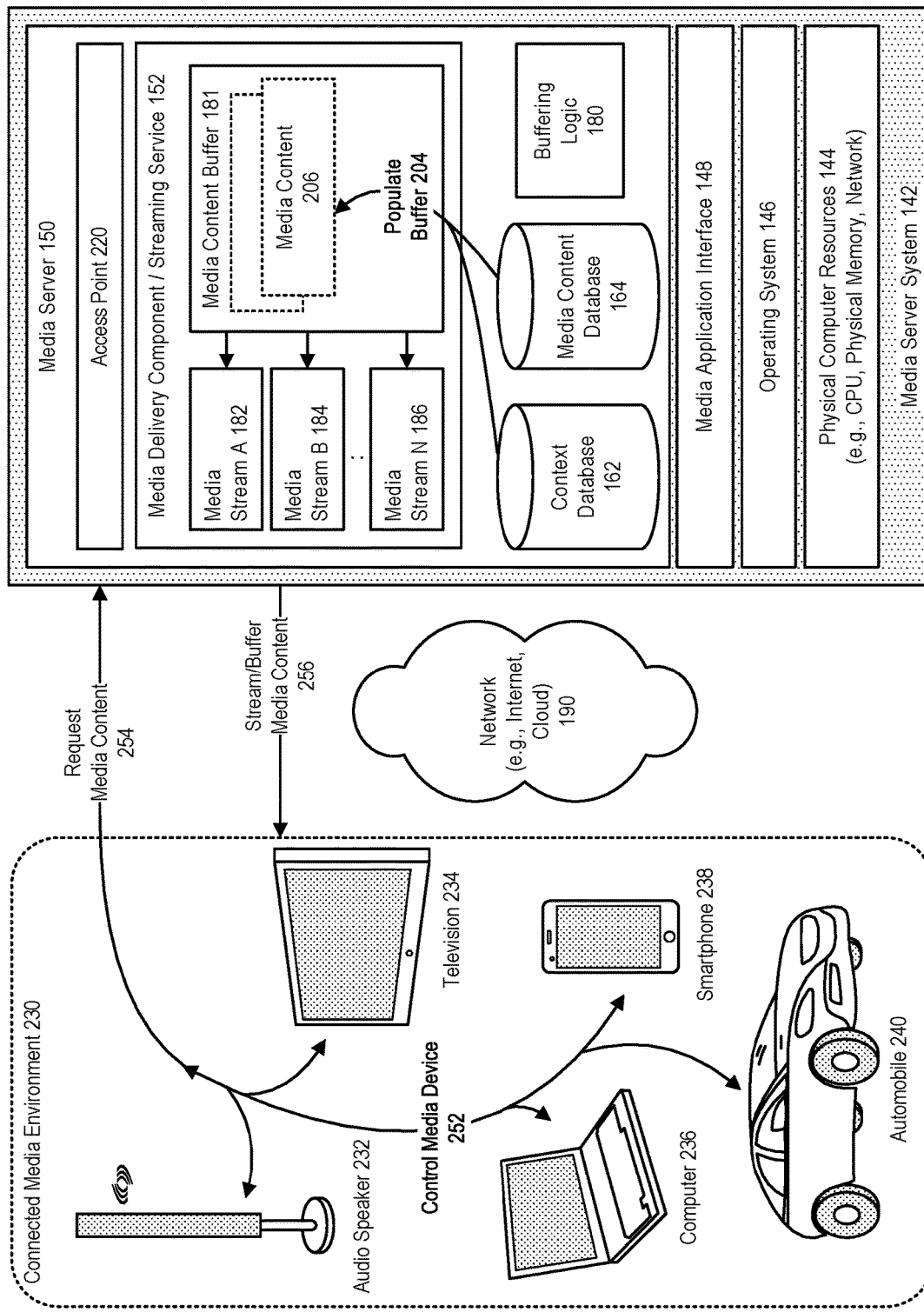
FIG. 2 further illustrates an example of a system for providing media content, in accordance with an embodiment.

FIG. 2 further illustrates an example of a system for providing media content, in accordance with an embodiment.

As illustrated in FIG. 2, in accordance with an embodiment, a connected media environment 230, for example a Spotify Connect environment, enables communication between a client device and the server-side access point in a connected manner from the perspective of a user. Examples of the types of media device that can be provided within a connected media environment include audio speakers 232, televisions 234, computers 236, smartphones 238, and in-car entertainment systems 240, or other types of media device.

In accordance with an embodiment, a client device having an application user interface can act as a controlling client device, to control 252 the playback of media content at a controlled device. In accordance with an embodiment, a client device can itself act as a media gateway or access point, for use by other devices within the system for providing media content.

In accordance with an embodiment, a controlled device can also include a media application, which in the case of an audio speaker, television or similar device can be included within the device itself as firmware logic, or within, for example, a separate set-top box or similar after-market device.

As described above, in accordance with an embodiment, a user can interact with the user interface at a client device, and issue requests to access media content, for example the playing of a selected music or video item at their client device or at a controlled device, or the streaming of a media channel or video stream to their client device or to a controlled device.

For example, in accordance with an embodiment, a user can request that media content be buffered, streamed or received and played at a controlling client device such as a smartphone, and simultaneously buffered, streamed or received for playing at one or more controlled devices, such as an audio speaker. Similarly, for example, the user can issue a media-change request 254 to change a media channel, in response to which the media server can switch the media channel at the controlled device, and thereafter continue to stream or buffer media content 256 for the switched channel, at the controlled device.

As described above, in some instances, a portion of the media content can be pre-buffered at the controlled device, so that the switching to the channel at the controlled device operates in a seamless manner.

Figure 3:
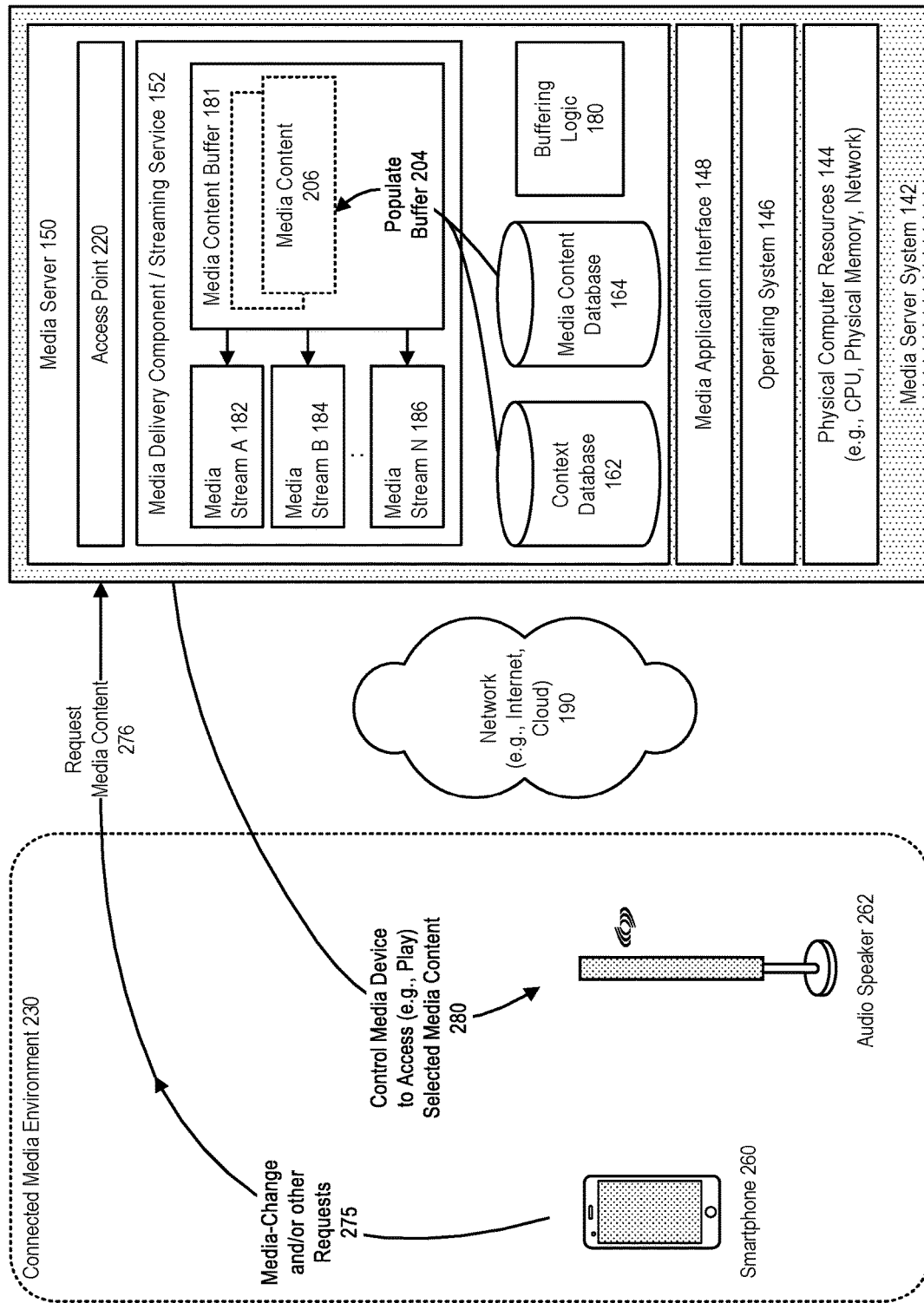
FIG. 3 further illustrates an example of a system for providing media content, in accordance with an embodiment.

FIG. 3 further illustrates an example of a system for providing media content, in accordance with an embodiment.

As illustrated in FIG. 3, a user can utilize, for example, a smartphone 260 in combination with an audio speaker 262, to issue a media-change request 275 from the smartphone, for example, to change a media channel at the audio speaker. The request can be received by the media gateway or access point, and communicated to the local media server, or to other media servers, as a request for media content 276, which can then respond by controlling the destination device (in this example, the audio speaker) to access (e.g., play) the selected media content 280.

Preference Profile

Embodiments of methods and systems will be described hereinafter in terms of media content provided by media servers to media devices via media streams. However, embodiments of methods and systems can be applied to any playback mode that relies on shuffling media content items (i.e., "shuffle mode"). For example, methods and systems can be applied to playback in shuffle mode of media content stored locally on a media device. In still other embodiments, methods and systems can include providing media content from both local media content and media content streamed from media servers. For example, if media content items selected for playback on a media device and inserted into a queue are also owned by a user and available on local storage, methods and systems can access and use the local media content when the media content item is queued for playback, thereby reducing the bandwidth used to stream media content from the media server.

Figure 4:
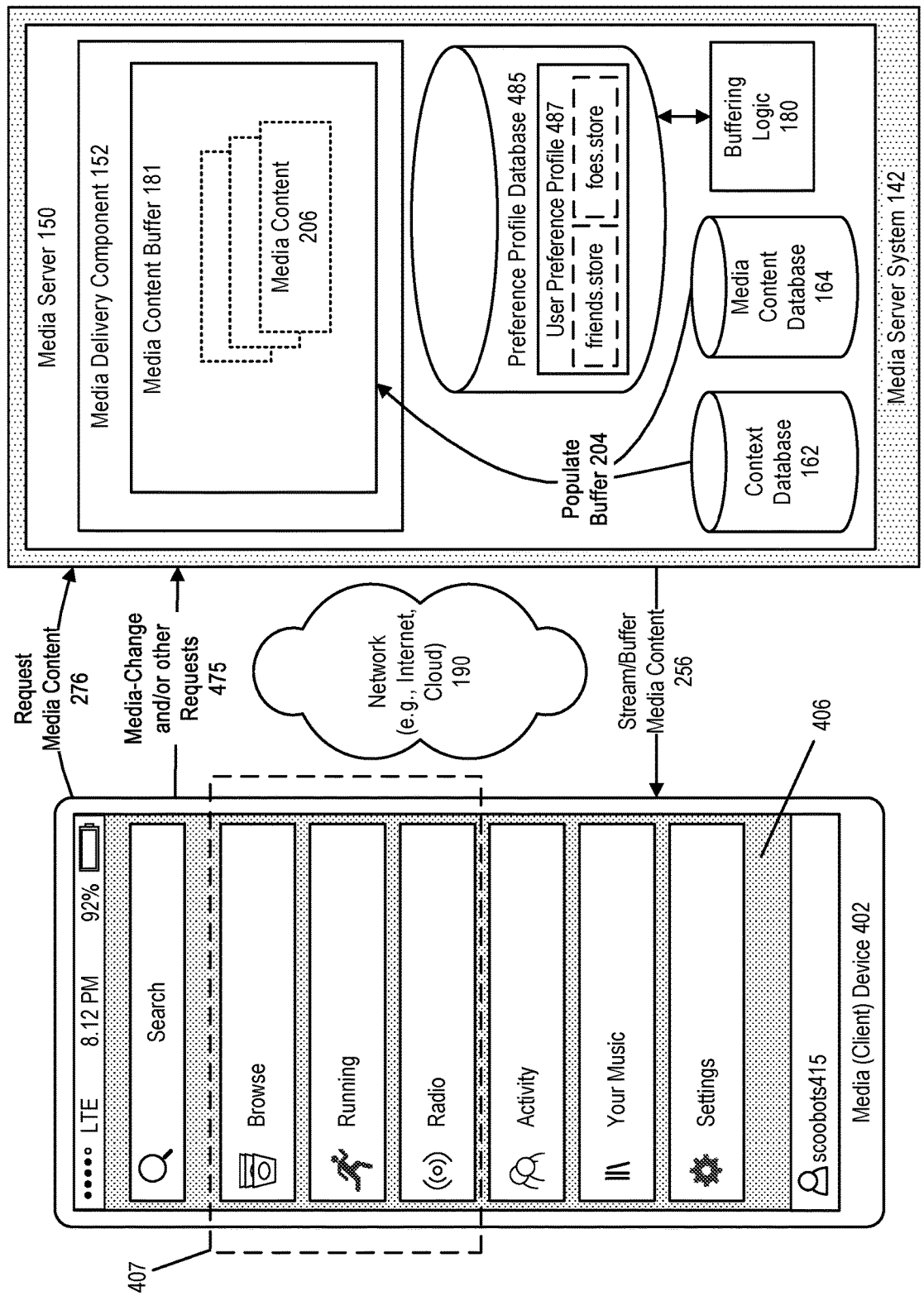
FIG. 4 illustrates an interface for a media (client) device for selecting and receiving a stream of media content, in accordance with an embodiment.

FIG. 4 illustrates a system for ordering media content items in response to an initiation by a user of a media (client) device 402, such as a smart phone or media player, to provide media content in shuffle mode, in accordance with an embodiment. An interface 406 for the media device is shown for selecting and interacting with a media application to playback media content. The interface provides options for searching and playing media content. The media application interface may also provide options for interacting with other users ("activity") and adjusting application settings ("settings"). The system further comprises a preference profile database 485 storing user preference profiles 487 including data stores friends.store and foes.store, which are further described below.

As mentioned above, media content can be provided to users based on a variety of service models and at paid and free service levels. Much of the functionality of the media application includes providing content selected in groupings, rather than by selection of individual media content items. Services that provide free service levels often do not provide the ability to select and play specific media content items. Media content is provided in groupings by way of playlists that comprise listings of media content items created by the service, by other users, or by curators commissioned or otherwise engaged by the service or other affiliated entity, such as an advertiser. Media content is also provided in groupings by way of "radio" functionality that typically stream much larger sets of media content items than most playlists. As shown in FIG. 4, the media application interface provides several grouped listening options 407. These grouped listening options stream media content items in shuffle mode, randomly selecting media contents items for insertion into a stream.

Media content items in playlists and radio stations are often grouped according to one or more common themes, such as genre, mood, musical qualities, similarity to certain artists, etc. For example, as shown the media application interface provides access to playlists specifically compiled for runners within a "Running" option provided on the home screen of the media application. The media application interface also provides access through user selection of "Browse" to many more playlists compiled for a variety of themes, including new releases, genre and mood, top hits, etc. Still further, the media application interface provides access through user selection of "Radio" to media content items grouped based on artists, albums or general genres. As mentioned, radio stations can be much larger than a typical playlist. Further, the media content items listing for a playlist is typically available for a user to peruse, while the media content items associated with a radio station are not typically available to a user. Rather, the user relies on knowledge of the genre or artist with the expectation that media content items having similar musical qualities will be streamed.

Despite their inclusion in a common playlist or radio station, individual media content items within the playlist or radio station can be disparate in terms of musical qualities such as beat, melody, general volume, etc. Media content items will not always be well paired, for example due to a drastic change in tempo or tone. Often, incompatibility of media content items can be avoided or reduced through careful curation and arrangement by a playlist creator. However, with very large playlists and radio stations it is not always practical to carefully order playlists or radio station media content items, therefore such groupings rely on shuffle mode to order the media content. Still further, the subjectivity of the user experience makes effective arrangement very difficult. Media content items may individually appeal to users in different contexts, or not at all.

Figure 5A:
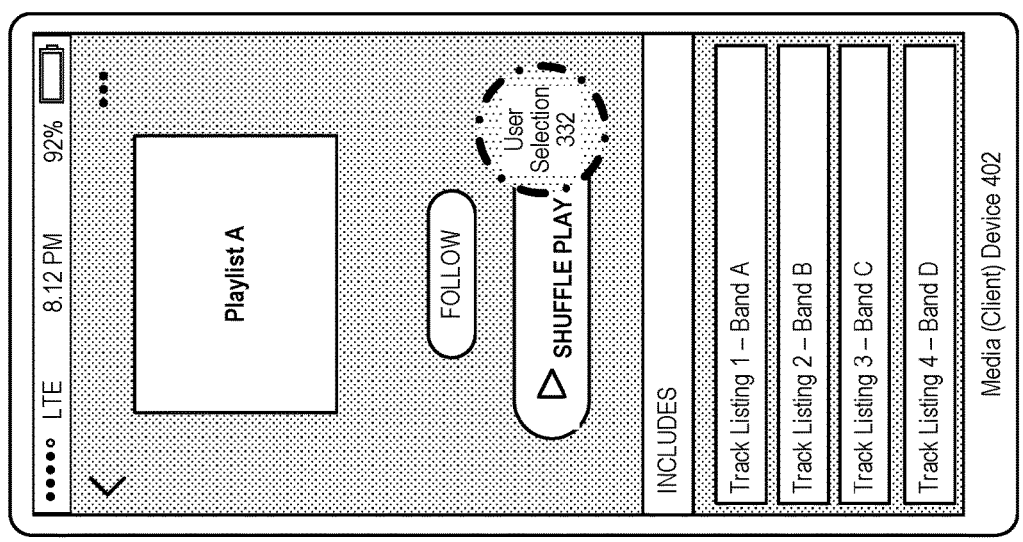
FIGS. 5A-5C illustrate use of the media device of FIG. 4 to select various streaming options, in accordance with an embodiment.
Figure 5A:
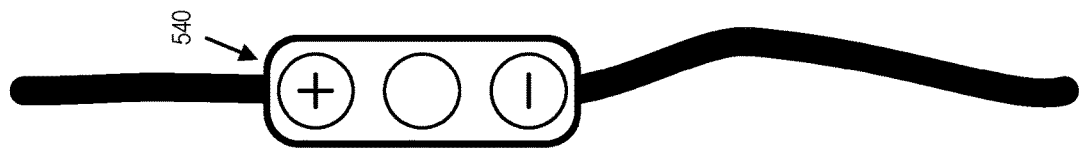
Figure 5C:
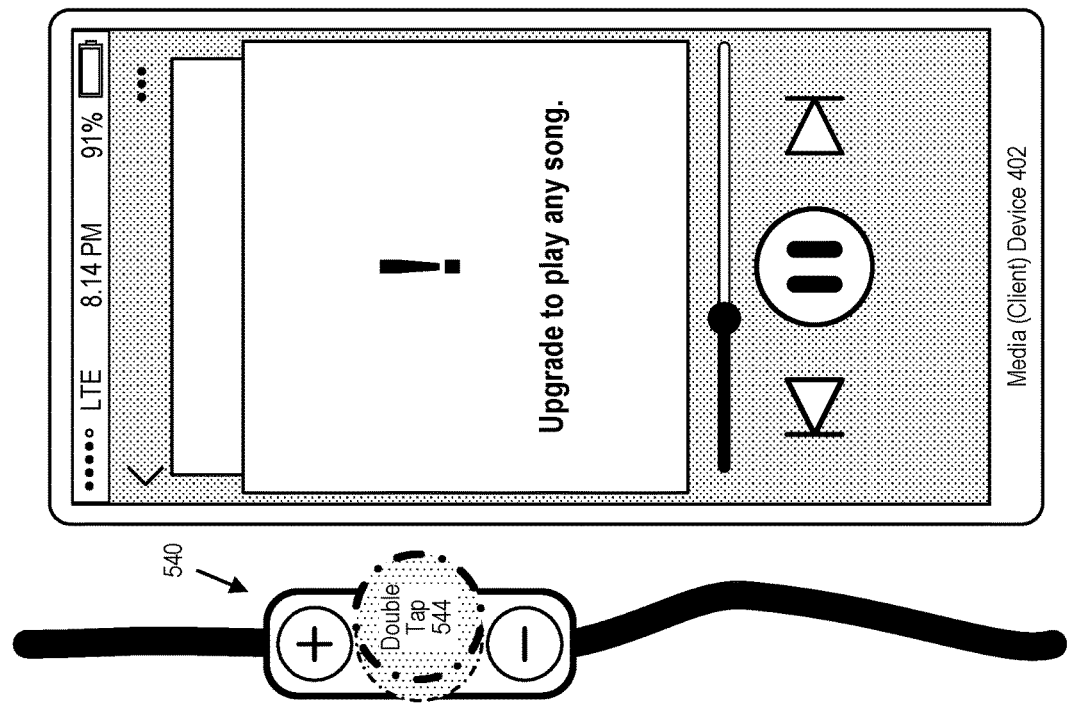
Figure 5B:
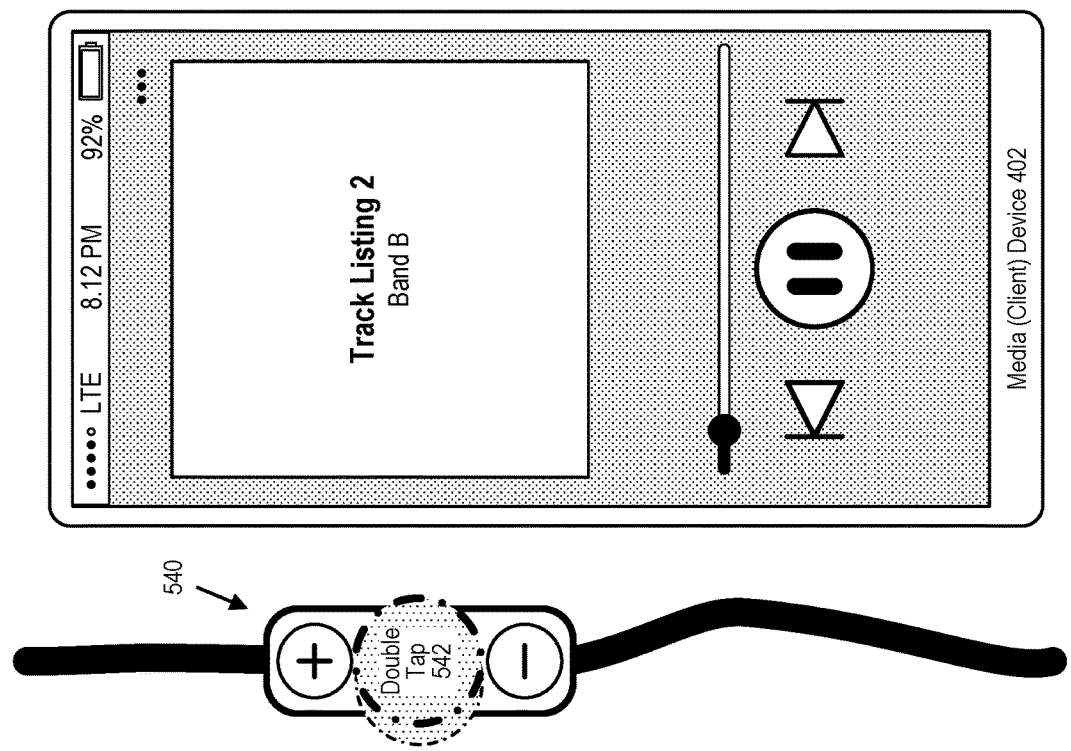

FIGS. 5A-5C illustrate use of the media device of FIG. 4 to stream media content contained in the playlist "Playlist A". While a user may interact with the media device to select and play media content, many users prefer to interact with the media content using a remote 540. In a typical use scenario, a user may start media playback, then place their media device in a pocket, bag or sports band, preferring to use the remote while the media device remains stowed. In-line remotes are common and can be found, for example, along the wires connecting headphones or earbuds to the media device.

Most in-line headphone and earbud remotes support volume control (+/−), but also include at least a third button that can be used to start and stop playback of media content on the media device. This button can include additional functionality. For example, many media devices and media applications respond to a double click of the third button to skip the currently streaming media content item and advance to the next item without having to interact with the screen (or keyboard) of the media device.

FIG. 5A shows the user having opened the playlist "Playlist A" and making the user selection 332 "Shuffle Play" to begin streaming media content items listed in the playlist. FIG. 5B shows the user listening to a few seconds of the next media content item inserted into the stream and double-clicking 542 the in-line remote to advance to the next media content item (i.e., a media-change request 475 in FIG. 4). FIG. 5C shows the user again listening to a few seconds of the next media content item inserted into the stream and double-clicking 544 the in-line remote to advance to the next media content item. However, the user has used up the permitted number of skips. Instead, the media content item continues to stream and be played by the media device, and a notification is displayed on the screen directing the user to upgrade to a premium version of the service to play any song the user chooses (and to be provided unlimited skips).

When a user decides to skip a media content item in the stream, the user is expressing dissatisfaction with the media content item selected by the system. Further, the user's experience is disrupted by the need to take action to skip to the next media content item. This can irritate or frustrate the user when the user is engaged in an activity such as exercise, where the user wants their focus to be on the activity and wants the media content to help provide focus, rather than to disrupt the user. If a user is not using a remote, the user is inconvenienced by having to fetch the media device, possibly unlock the media device, and select the forward skip icon or press a physical skip button. If the user is using an in-line remote, the tactile input device of the in-line remote can be cumbersome to use, with user's accidentally single clicking, for example, pausing playback altogether, or triple clicking, which in some media applications can result in an action other than skipping, such as replay of previous media content item. This can result in further irritation. Still further, when a user runs out of skips, the user is forced to continue listening to the media content item. While such irritation may lead some users to abandon the use of features that rely on shuffle mode or upgrade to unlimited skips, user dissatisfaction can also lead to abandonment of the service.

In accordance with an embodiment, a system and method of ordering media content items in response to an initiation by a user of a media playback device to provide media content in shuffle mode can make use of "friend-or-foe" relationships between pairs of media content items. A preference profile for the user is used to select media content items for a playlist that is played in shuffle mode. The preference profile is a data structure that comprises data indicating a positive or negative pairing of media content items with as many other media content items for which the data has been collected. The media content items are paired with in a "friend-or-foe" relationship that indicates a positive or negative pairing, and optionally a degree of positive or negative pairing. In an embodiment, a preference profile for a user can be stored on the media device itself. In other embodiments, the preference profile for a user can be stored on a media server remote from the media device. In still other embodiments, the preference profile for a user can be stored on the media device and pushed to the media server periodically, such as at the start of a session.

A user's preference profile can be stored in a database 382 at the media server. As shown, the preference profile maps to a friends.store and a foes.store associated with a user. In accordance with an embodiment, the system can select media content items for play in preference to the "friends" of a currently playing media content item, as indicated in a preference profile. As an example, pseudo code for selecting a media content item may comprise the following.

```
*/
//Let p be playlist
//Let new be songs recently added
friends.store(A,pair(B,count++))
shufflePlay(p) {
    /* Optional, we can either choose randomly from the new songs
     * which the user might want to listen first
     */
    if(chooseFromNewSongs && newSongsAddedToPlaylist(p)) {
        pickRandomSong(new)
    }
    pickRandomSong(p)
}
selectNextSong(Playlist p, Prev prev) {
    //try to choose from friends from playlist context first, if we have
enough data. This can be either a fixed number (such as 3), or a
percentage based on the number of the songs in the playlist, i.e. 20%
    if (canChoosePlayListFriend(p, prev)) {
        choosePlayListFriend(p);
    } else if (canChooseTrackFriend(prev)){
        //see if the track itself has enough data, the same as above either
based on training data (fixed number)
        chooseTrackFriend(prev);
    } else {
        chooseNextSongRandom(p.substract(getFoes(prev)));
    }
}
choosePlayListFriend(Playlist p, Track prev) {
    return findFriendsWithHighestScore(p, prev, n);//n -> fixed number,
how many of top n, i.e. top 3
}
chooseTrackFriend(Track prev) {
    return findFriendsWithHighestScore(prev, n);//n -> fixed number,
how many of top n, i.e. top 3
}
findFriendsWithHighestScore (p, prev, n) {
    // find the top n tracks from the map, to be chosen randomly from
}
```

As shown in the exemplary pseudocode, playback begins with the system selecting a media content item. As shown the media content items comprise songs, although the media content items could alternatively comprise video, spoken word, or any other media. In this case, the system randomly chooses from two sets of data from the preference profile of the user, the new media content item (in this case songs recently added to the playlist (newSongsAddedToPlaylist (p)) or all of the songs contained in the playlist (pickRandomSong(p)), with preference given to songs recently added to the playlist. These may be new songs added since the user last accessed the playlist, or new songs added within a set time period, such as the previous week, for example.

The system then selects the next song to follow the current song. In this example, the system preferentially selects the next song starting with data for the current song in the context of the playlist (choosePlayListFriend). The system relies on the current song's friend-and-foe relationships within the playlist. However, data also exists that tracks the relationships of each song in the context of any shuffle mode selection. This relationship is agnostic as to a particular playlist or radio station. If there is not enough data available in the playlist context, the system will then relies on the current songs friend-and-foe relationships in the context of any shuffle mode selection (chooseTrackFriend). Once the source of the data is chosen, a song is randomly selected from the top friends with scores above a threshold (findFriendsWithHighestScore).

Figure 6:
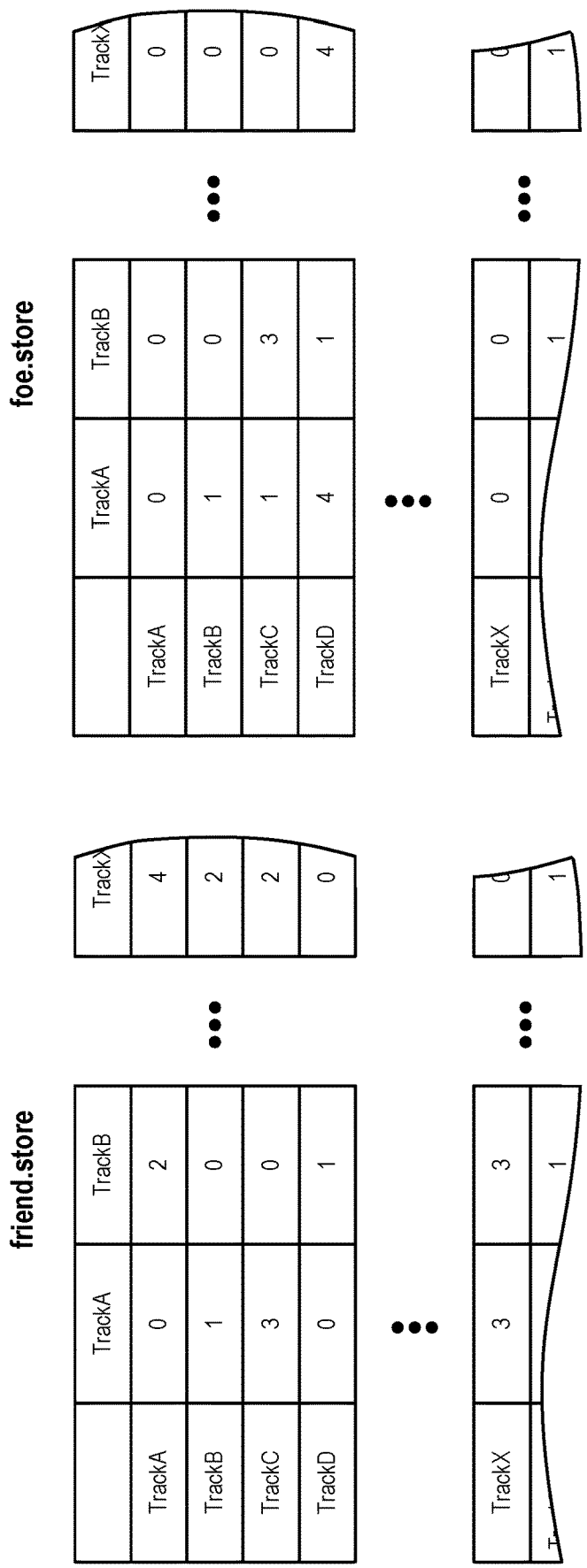
FIG. 6 illustrates a pair of data stores for use with a method of ordering media content for playback to a media device in response to initiation by a user of the media device, in accordance with an embodiment.

Referring to FIG. 6, exemplary data stores are shown as array structures. Each media content item (e.g., TrackA) has a relationship with every other media content item in the data structure. The data structure can expand as new media content items are added. Some relationships are not established, and are shown with a neutral relationship ("0"). Others have varying "friendliness" or "foeness". For example, TrackA has a strong friend relationship with TrackX, indicated by the "4" in the data structure. The data representing the friend and foe relationships between media content items can be updated as the stream or other playback progresses.

Initially, the preference profile can be trained by the system observing the response of the user to the playback of media content items from a queue. In accordance with an embodiment, the method can apply simple 1-to-1 relationships between media content items. The relationships can be a simply positive or negative (1 or 0) relationship, or as shown in FIG. 6 the media content items can have relationships with varying degrees of friendliness or foeness. A media content item can become a "super friend" of another media content item, thereby preferentially following or being followed by the other media content item, or a "super foe" of another media content item.

Further, as shown in the pseudocode, the relationships may be provided context. Two media content items may have a different relationship when played in a "Running" playlist, as opposed to when played in a radio station. Alternatively, relationships between media content items can be agnostic as to the playlist or radio station in which it is listed, and can span playlists (e.g., the system can select only from chooseTrackFriend rather than choosePlayListFriend).

Further, in some embodiments, the relationships can be directional so that when played in one order a pair of media content items can have one relationship, while when played in the reverse order the pair of media content items can have a different relationship Upon reflecting on the teachings herein, one can appreciate the many different ways in which pairs of media content items can relate to one another. For purposes of discussion and simplification, the method will be discussed in an embodiment reflected in the pseudocode where a varying positive/negative relationship exists between media content items.

A "friend-or-foe" relationship can be established between a pair of media content items by the interaction of a user with the stream or the inaction of a user. For example, a negative, or "foe", relationship can be established between consecutive media content items if the user skips the later media content item. In accordance with an embodiment, the "foe" relationship can be established at any time that the user skips the later media content item. In other embodiments, the "foe" relationship can be established if the user skips the later media content item within a certain number of seconds or before a certain amount of the later media content item has been streamed. In still other embodiments, a "foe" relationship is not created until the later media content item is skipped a threshold number of times. A positive or "friend" relationship can be established between consecutive media content items if the user does not interrupt the later media content item. Relationships can be updated continuously as the user consumes media content items, with "friends" becoming "foes" or "foes" becoming "friends".

As an example, pseudo code for establishing a relationship between media content items may comprise as follows, and may be inserted into the previously discussed pseudocode.

```
// Event called when a user finishes listening a song
onEndSong(PreviousTrack prev, CurrentTrack curr, Playlist p) {
    //build friendship data
    friendship = entry(curr,pair(prev,count++));
    //save data for this track
    prev.friends.store(friendship)
    //save data for this track in the playlist context
    p.friends.store(friendship);
}
onSkipSong(PreviousTrack prev, CurrentTrack curr, Playlist p) {
    //build foe data
    //Optional - if a track was a friend before but now skipped
    //give a higher penalty, this can either be a bigger fixed number
    //such as 2 or exponential
    if (wasFriendBefore(prev,curr)) {
        foe = entry(curr,pair(prev,count + 2));
    } else {
        foe = entry(curr,pair(prev,count++));
    }
    //save data for this track
    prev.foes.store(friendship)
    //save data for this track in the playlist context
    p.foes.store(friendship);
}
```

As shown, when a user finishes listening to a song without interrupting the playback, upon an end of the song, the system updates the friends.store by incrementally adding to the friend count in the data structure associated with the currently ending song with the previous song (friendship=entry(curr,pair(prev,count++))). The data is saved for both the friends.store associated with the playlist context, and the friends.store associated with the song agnostic to the playlist context.

However, if the user skips the currently playing song, the system incrementally adds to the foes.store (foe=entry(curr, pair(prev,count++))). Optionally, if the currently playing song was a friend of the previous song, they system may assume that the user has tired of the currently playing song and can more aggressively degrade the relationship between the songs, for example by increasing the incremental addition to the foes.store (foe=entry(curr,pair(prev,count+2))). In a further embodiment, if the system concludes that the user has tired of the currently playing song, the system can incrementally add to the foes.store for all relationships for the currently playing song. Upon reflecting on the teachings herein, one can appreciate the many different ways in which relationships between media content items can be altered based on the reaction of a user to their pairing in a playback queue. The system and method can be react to a user's interaction with a queue in many different ways and with varying degrees of aggressiveness in modifying the relationship data.

It should be noted that as shown above in the pseudocode and as discussed thus far, the selection of a media content item to follow another media content item in a queue is made when the current media content item is streaming or otherwise playing back. However, in embodiments, an entire queue can be selected at the initiation of playback and thereafter modified in response to the user's interaction with the queue. For example, upon selection of the first media content item, a queue can be built based on the "friend-or-foe" data for the following media content item and then for each subsequently selected media content item in order through the queue. In the context of a media stream to a media device from a media server, this can allow the media server to buffer media content items at the media server and then deliver the stream to the media device for buffering at the media device. Once the user interrupts the queue, the queue can be rebuilt based on the friend-or-foe data for the newly selected media content item and then for each subsequently selected media content item in order through the rebuilt queue.

In alternative embodiments, the queue can be built incrementally each time a media content item is played back, or the queue can be built for a certain number of media content items. These methods of building queues may be desired where bandwidth is limited, for example, and the system seeks to limit delivery of media content to avoid consuming bandwidth. In other embodiments, the system may seek to switch between methods of building queues based on a connection to the media device. For example, where a media device is connected with the service via a WI-FI connection, the system may seek to build out and buffer an entire queue at the media device, whereas where a media device is connected with the service via a 2G cellular connection, the system may seek to build out an entire queue but only buffer a single song at the media device, or build out the queue with playback of each media content item.

FIGS. 7A-7E is a visual representation of a method of ordering media content items in response to an initiation by a user of a media playback device to provide media content in shuffle mode, in accordance with an embodiment. The method begins with the user selection to play a playlist. The system then select an initial media content item to insert into a queue for playback by the media device of the user. In accordance with an embodiment, the system can randomly select a media content item from the playlist. In other embodiments, if a preference profile exists for the user, the system can search for a media content item from the playlist that has a threshold number of "friends". As described above, the media content item can be chosen from newly added items or the playlist as a whole.

Figure 7A:
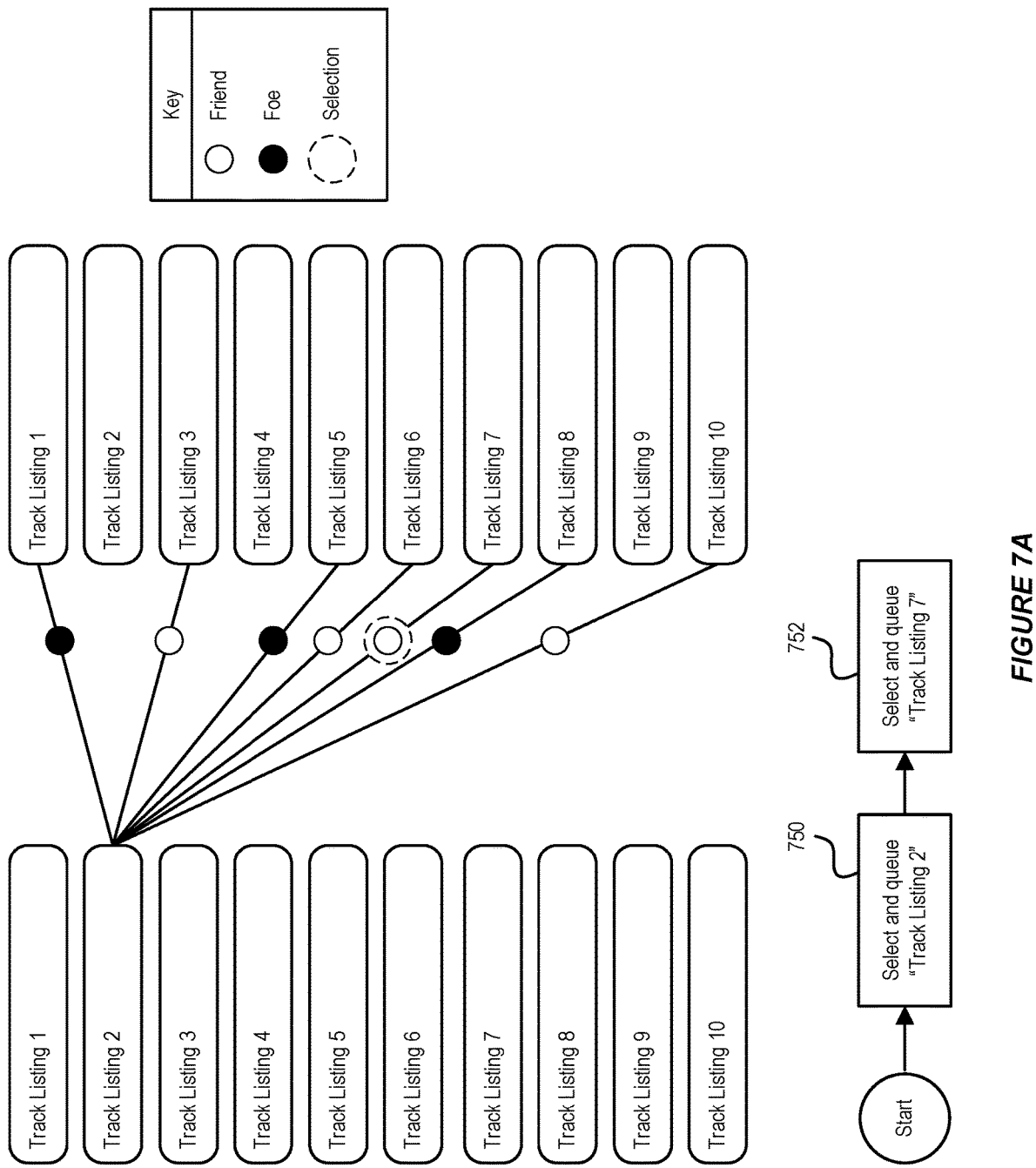
FIGS. 7A-7E illustrate a method of ordering media content for playback to a media device in response to initiation by a user of the media device, in accordance with an embodiment.

As shown in FIG. 7A, the system randomly selects "Track Listing 2" and inserts the media content item into a queue 750 which will then be provided to the media device, either just before the media content item is due for playback, or prior to playback for buffering at the media device. The preference profile for the user indicates that "Track Listing 2" has seven relationships with other media content items listed in the playlist, including three "foes", reflected by the black circles, and four "friends", reflected by the white circles. The system then selects a "friend" of "Track Listing 2" to be inserted into the queue. In an embodiment, the system can randomly select from among the "friends" of "Track Listing 2" with preference to the highest friend relationships or randomly from amongst all "friends". In other embodiments, the system can select the "friend" of "Track Listing 2" that itself has the most "friends" or that has the fewest "foes". As shown, the system selects "Track Listing 7" and inserts the media content item into the queue 752.

Figure 7B:
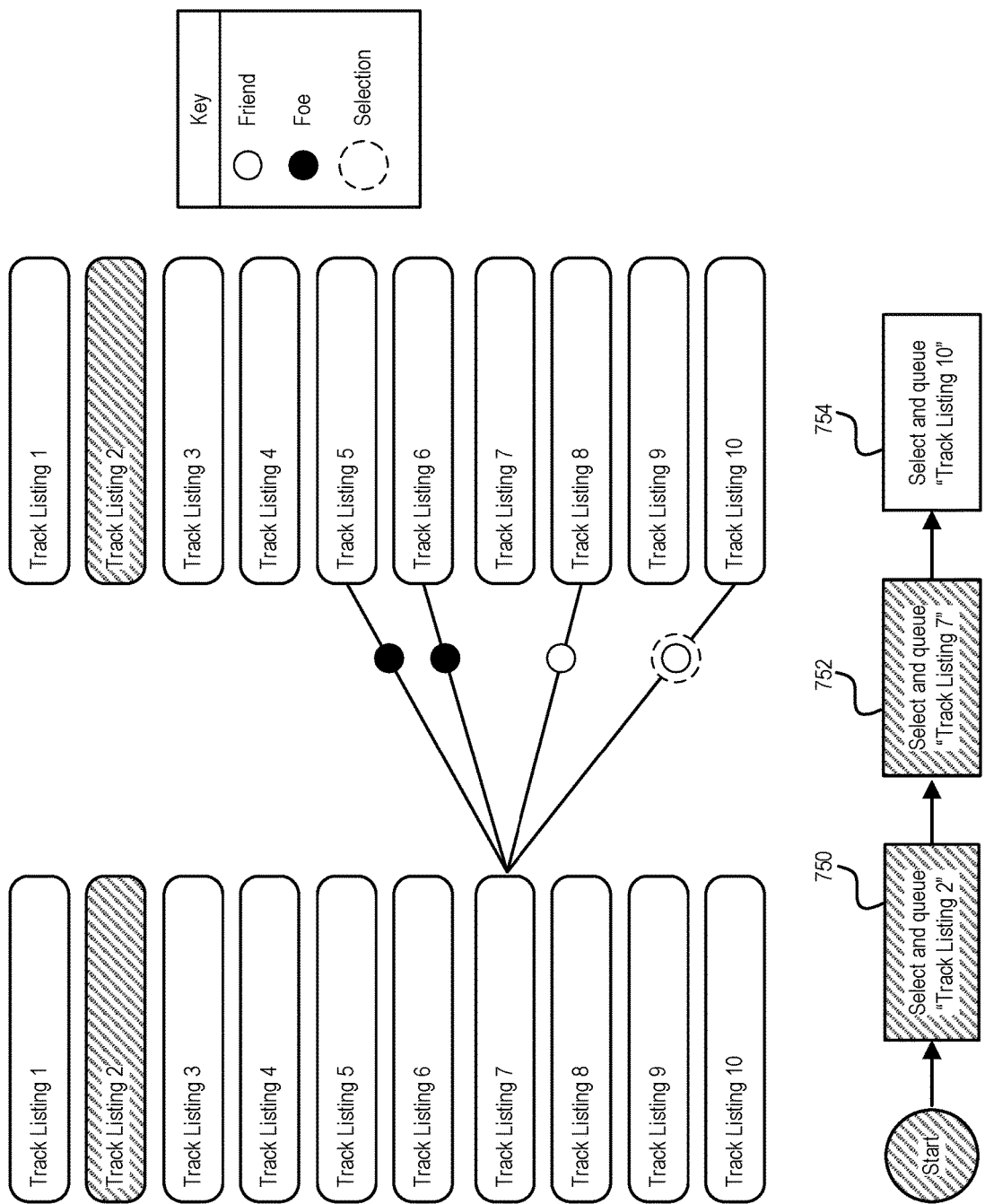

Referring to FIG. 7B, the media content item "Track Listing 2" is removed from the pool of available media content items. It can be returned to the pool after a certain number of media content items have been inserted into the queue, or alternatively once all other media content items have been inserted into the queue or not at all. As shown, the preference profile for the user indicates that "Track Listing 7" has four relationships with other media content items listed in the playlist, including two "foes", reflected by the black circles, and two "friends", reflected by the white circles. In a similar manner to the previous selection, the system selects a "friend" of "Track Listing 7" to be inserted into the queue. As shown, the system selects "Track Listing 10" and inserts the media content item into the queue 754.

Figure 7C:
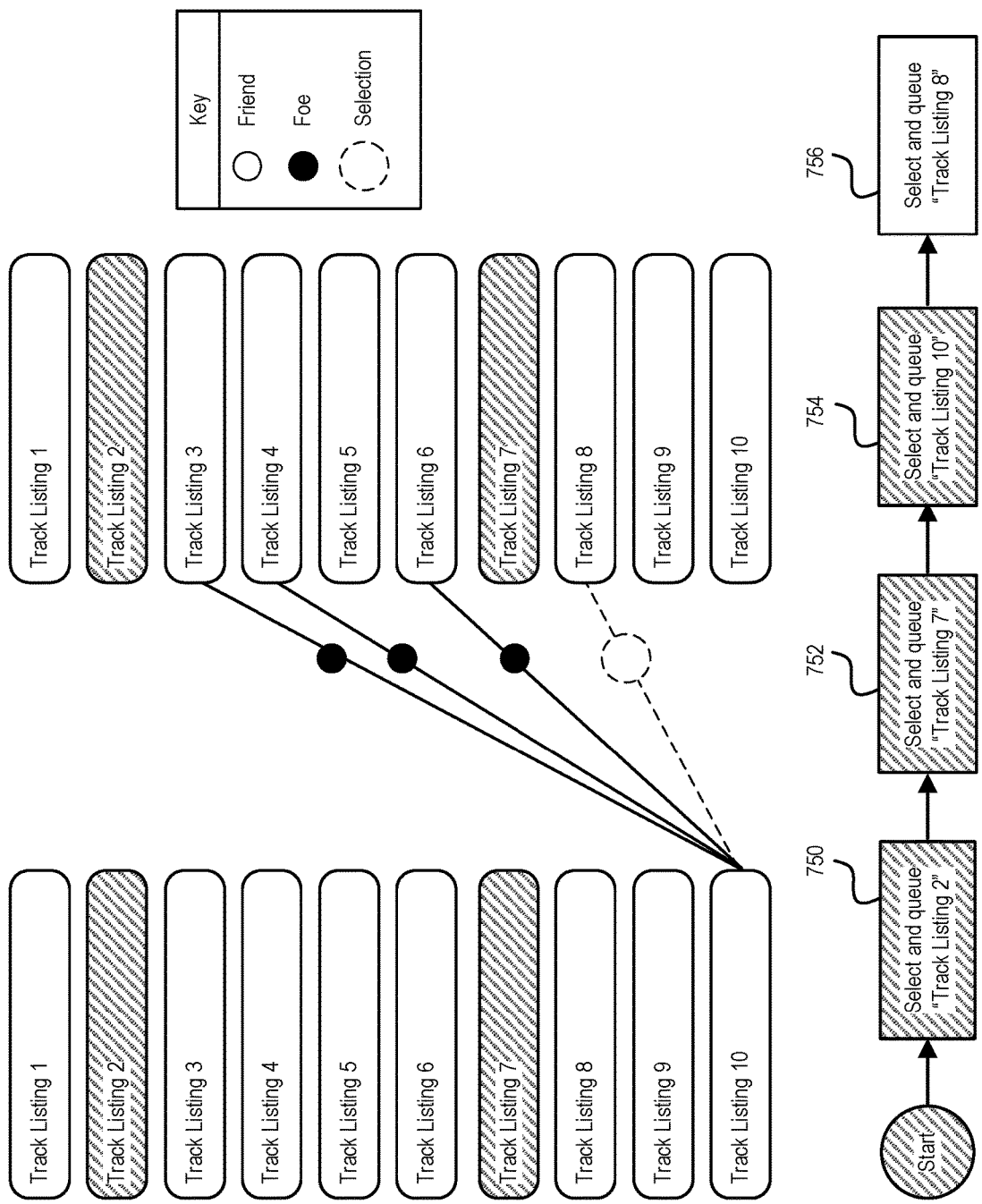

Referring to FIG. 7C, the media content item "Track Listing 7" is removed from the pool of available media content items. As with "Track Listing 2" it can be returned to the pool after a certain number of media content items have been inserted into the queue, or alternatively once all other media content items have been inserted into the queue or not at all. As shown, the preference profile for the user indicates that "Track Listing 10" has only three relationships with other media content items listed in the playlist, all "foes", reflected by the black circles. The system then selects a media content item that does not have a relationship to "Track Listing 10." The system can select the neutral media content item randomly, or based on the number of "friends" or "foes" of the available neutral media content items. As shown, the system selects "Track Listing 8" and inserts the media content item into the queue 756.

Figure 7D:
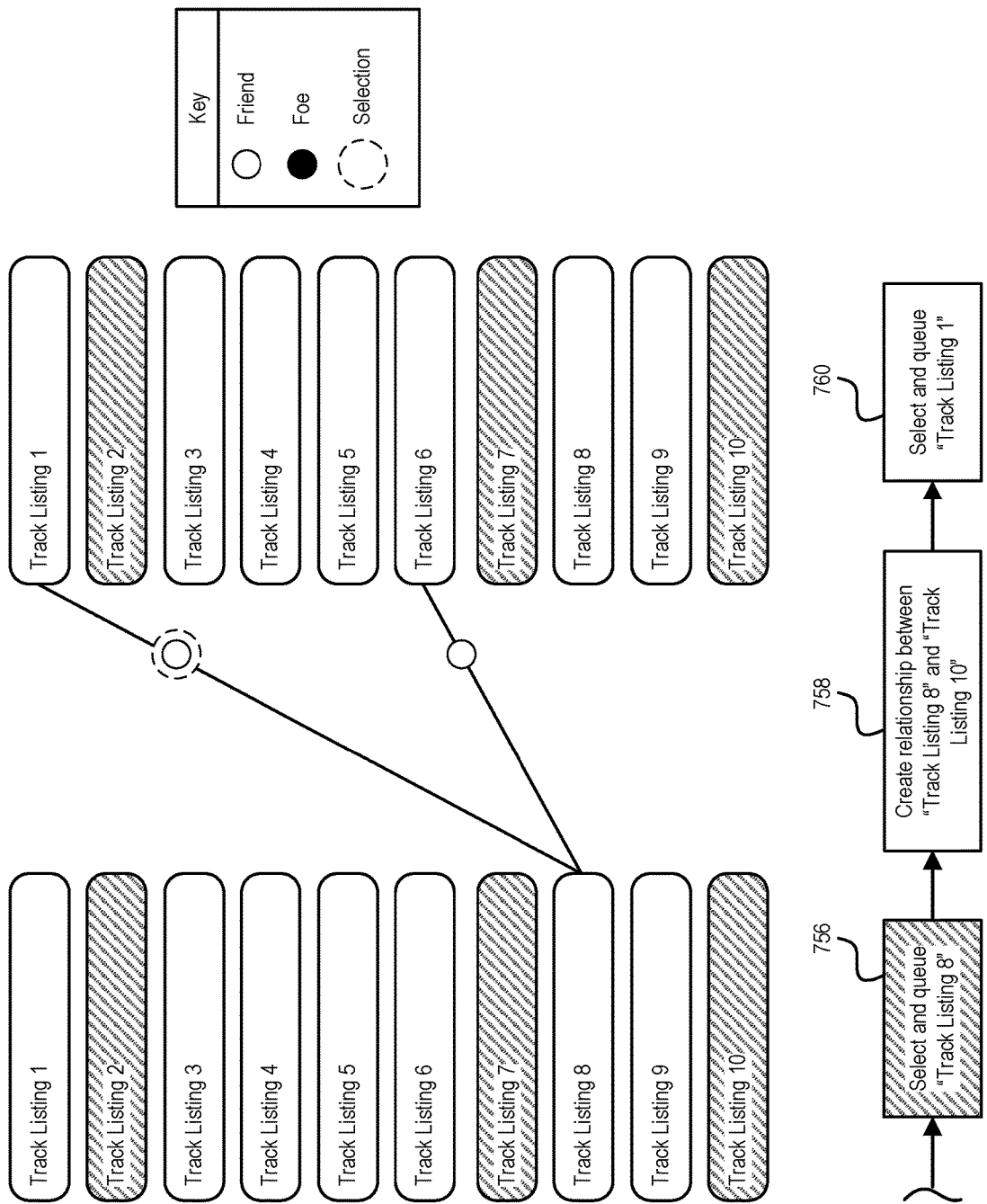

Referring to FIG. 7D, the media content item "Track Listing 10" is removed from the pool of available media content items, as with previously selected media content items. The system then creates a relationship between "Track Listing 10" and "Track Listing 8" based on the user's response. If the user skips "Track Listing 8" a "foe" relationship is created between "Track Listing 10" and "Track Listing 8", but if the user does not interrupt the queue a "friend" relationship is created between "Track Listing 10" and "Track Listing 8". As shown, the preference profile for the user indicates that "Track Listing 8" has two relationships with other media content items listed in the playlist, all "friends", reflected by the white circles. In a similar manner to the previous selection, the system selects a "friend" of "Track Listing 8" to be inserted into the queue. Alternatively, if the user has skipped "Track Listing 8", the system can select a media content item based, again, on the relationships of the "Track Listing 10", which would result in another selection from neutral media content items. Alternatively, if the user has skipped "Track Listing 8", the system can select a media content item based on the relationships of the "Track Listing 7", the last track for which "friend" relationships are available. As shown, the system selects "Track Listing 1" and inserts the media content item into the queue 760.

Figure 7E:
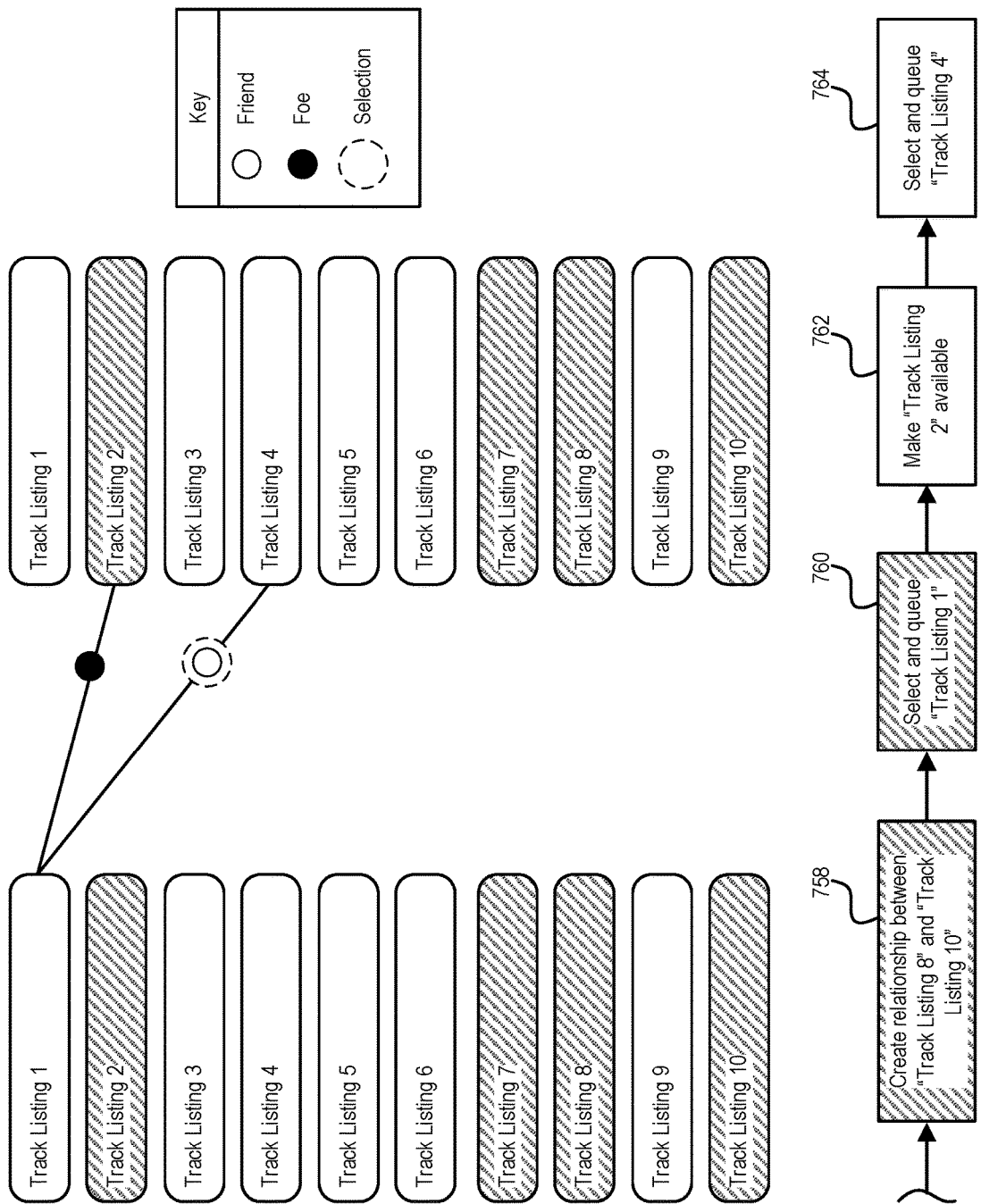

Referring to FIG. 7E, the media content item "Track Listing 1" is removed from the pool of available media content items, as with previously selected media content items, and the media content item "Track Listing 2" which was previously inserted into the queue is made available again 762. As shown, the preference profile for the user indicates that "Track Listing 1" has two relationships with other media content items listed in the playlist, a "foe" and a "friend". The system selects the "friend" of "Track Listing 1" to be inserted into the queue. As shown, the system selects "Track Listing 4" and inserts the media content item into the queue 764.

As previously remarked, any of the relationships between media content items can change. For example, if the user were to skip "Track Listing 7" inserted into the queue based on a "friend" relationship to "Track Listing 2", the relationship can be changed to "foe". In accordance with an embodiment, once all "friends" and media content items with neutral relationships have been inserted into the queue, media content items with only "foe" relationships can then be inserted into the queue. In other embodiments, media content items with only "foe" relationships and no neutral relationships can be omitted from insertion into the queue.

As will be appreciated, creating a preference profile empty of relationships can result in mismatches between a user's taste and a system's selection for building a queue. A learning curve for creating relationships that will reduce the mismatches between a user's taste and a system's selection can be slow, given the large volume of media content items and playlists. Preferably, a service would like to build relationships as quickly as possible to provide the best experience for the user, based on the user's subjective preferences. The preference profile can be pre-trained in different ways. For example, the system can examine how the user listens in non-shuffle mode and can extract from historic change data in the playlist database. It can also be pre-trained by copying preference profile data from other users with similar taste to the user.

FIG. 8A is a sample match list 880 and FIG. 8B is a flowchart for a method of building a preference profile for a user, in accordance with an embodiment. As shown, the preference profile for the user "scoobots415" is either stored on the media server of the system or pushed to the media server of the system. When a threshold level of relationships are established on the preference profile, the system can identify those users that match to a highest percentage to the user 882. The numbers shown in the exemplary list of highly matched users are merely exemplary and do not represent real data, and the usernames are completely randomized and do not represent actual users. The system can select those matches that exceed a threshold, for example 60%, and train the preference profile of the user by populating data stores with relationship data contained in the data stores of the other users 884. As shown, two users match with scoobots415 at 63%. Data stores for both the title and the playlist contexts can be populated with the relationship data of the other users. The relationships can be selected starting with the highest matched users and working to the lowest matched users among those that exceed a certain threshold. Already existing relationships within the preference profile of the user can remain unchanged. The user's preference profile can be updated based on the user's response to the ordering of media content items within queues 886. The system can periodically re-determine the highest preference profile match rates for the user 888 and expand the user's preference profile based on other users that have a re-determined match rate that exceeds a threshold 890.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while the techniques described above generally illustrate examples such as a music streaming service such as Spotify, and streamed music or song content, the systems and techniques described herein can be similarly used with other types of media content environments, and other types of streamed data or media content.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing media content items in response to a request by a user of a media device to access media content, the system comprising:
    a media server operating on one or more processors; and
    a memory storing computer program code, which causes the media server to, in response to the request:
        determine a preference profile associated with the user, wherein the preference profile indicates at least one of a positive or negative relationship of each media content item indicated by the preference profile with other media content items indicated by the preference profile; and
        determine, based on the positive or negative relationships indicated by the preference profile, one or more media content items for insertion into a queue of ordered media content items to be streamed to the media device, including:
    selecting particular media content items for insertion into the queue based on a degree of positive or negative pairing between the particular media content items and other media content items, as indicated by the preference profile;
    wherein the preference profile is stored as a data structure and updated in response to modifications by the user to the queue of ordered media content items.

2. The system of claim 1, wherein ordering the one or more media content items includes arranging the one or more media content items consecutively within the queue in preference to positive relationships; and
    wherein the memory storing computer program code causes the media server to order, if the preference profile does not exist, the set of media content items for insertion into the queue according to a set of rules and create the preference profile for the user starting with an initial media content item inserted into the queue.

3. The system of claim 2,
    wherein each of the one or more media content items is inserted once into the queue, and
    wherein ordering the one or more media content items includes selecting a succeeding media content item randomly from any of the one or more media content items not previously inserted into the queue that has a positive relationship with a preceding media content item until all positive relationships are exhausted.

4. The system of claim 1, wherein progression through the queue is affected by:
- interaction of the user with the media playback device to alter the ordering of the set of media content items in the queue, and
- inaction of the user to alter the ordering of the set of media content items in the queue.

5. The system of claim 2,
- wherein progression through the queue is affected by interaction of the user with the media playback device to alter the ordering of the set of media content items in the queue includes advancing from a current media content item to a next media content item within a predefined period of time of playing the current media content item;
- wherein advancing to a next media content item creates a negative relationship between the current media content item and a preceding media content item that was played to completion in the preference profile;
- wherein inaction of the user to alter the ordering of the set of media content items in the queue creates a positive relationship between the current media content item and the preceding media content item that was played to completion in the preference profile.

6. The system of claim 1, wherein the preference profile is stored on the media playback device, and the memory storing computer program code further causes the media server to:
- obtain the preference profile from the media playback device.

7. The system of claim 1, wherein the preference profile is stored on the media playback device and periodically pushed to the media server for storage, and the memory storing computer program code further causes the media server to:
- determine whether the preference profile stored on the media server at the time of initiation matches the preference profile from the media playback device.

8. The system of claim 1, wherein the preference profile is stored on the media server, and wherein the memory storing computer program code further causes the media server to:
- compare the preference profile for the user to preference profiles for a plurality of other users;
- determine a preference profile for one or more of the other users that match the preference profile within a threshold limit; and
- expand the preference profile for the user by adding positive or negative relationships based on the preference profile for the one or more of the other users.

9. A method for providing media content items in response to a request by a user of a media device to access media content, the method comprising:
- determining, in response to the request by the user, a preference profile associated with the user, wherein the preference profile indicates at least one of a positive or negative relationship of each media content item indicated by the preference profile with other media content items indicated by the preference profile; and
- determining, based on the positive or negative relationships indicated by the preference profile one or more media content items for insertion into a queue of ordered media content items to be streamed to the media device, including:
  - selecting particular media content items for insertion into the queue based on a degree of positive or negative pairing between the particular media content items and other media content items, as indicated by the preference profile; and
- updating the preference profile associated with the user, including the indication of positive or negative relationships, wherein the preference profile is stored as a data structure and updated in response to modifications by the user to the queue of ordered media content items.

10. The method of claim 9, wherein ordering the one or more media content items includes arranging the one or more media content items consecutively within the queue in preference to positive relationships;
the method further comprising:
- ordering, if the preference profile does not exist, the set of media content items for insertion into the queue according to a set of rules and create the preference profile for the user starting with an initial media content item inserted into the queue.

11. The method of claim 10,
- wherein each of the one or more media content items is inserted once into the queue, and
- wherein ordering the one or more media content items includes selecting a succeeding media content item randomly from any of the one or more media content items not previously inserted into the queue that has a positive relationship with a preceding media content item until all positive relationships are exhausted.

12. The method of claim 10,
- wherein progression through the queue is affected by interaction of the user with the media playback device to alter the ordering of the set of media content items in the queue includes advancing from a current media content item to a next media content item within a predefined period of time of playing the current media content item;
- wherein advancing to a next media content item creates a negative relationship between the current media content item and a preceding media content item that was played to completion in the preference profile;
- wherein inaction of the user to alter the ordering of the set of media content items in the queue creates a positive relationship between the current media content item and the preceding media content item that was played to completion in the preference profile.

13. The method of claim 9, further comprising:
- obtaining the preference profile from the media playback device.

14. The method of claim 9, wherein the preference profile is stored on the media playback device and periodically pushed to the media server for storage, and further comprising:
- determining whether the preference profile stored on the media server at the time of initiation matches the preference profile from the media playback device.

15. The method of claim 9, wherein the preference profile is stored on the media server, and further comprising:
- comparing the preference profile for the user to preference profiles for a plurality of other users;
- determining a preference profile for one or more of the other users that match the preference profile within a threshold limit; and
- expanding the preference profile for the user by adding positive or negative relationships based on the preference profile for the one or more of the other users.

16. A non-transitory computer readable storage medium, including instructions stored thereon which when read and executed by one or more computers cause the one or more computers to perform the steps comprising:

detecting, at a media server, a request by a user of a media device to access media content;

determining a preference profile associated with the user, wherein the preference profile indicates at least one of a positive or negative relationship of each media content item indicated by the preference profile with other media content items indicated by the preference profile;

determining, based on the positive or negative relationships indicated by the preference profile one or more media content items for insertion into a queue of ordered media content items to be streamed to the media device, including selecting particular media content items for insertion into the queue based on a degree of positive or negative pairing between the particular media content items and other media content items, as indicated by the preference profile; and updating the preference profile associated with the user, including the indication of positive or negative relationships, wherein the preference profile is stored as a data structure and updated in response to modifications by the user to the queue of ordered media content items.

17. The system of claim 1, wherein a set of media content items inserted into the queue of ordered media content items to be streamed to the media device includes one or more advertisements that are selected based on the preference profile associated with the user.

18. The system of claim 1, wherein the request that causes the media server to determine a set of media content items based on the preference profile is provided by an operation of a shuffle mode.

19. The method of claim 9, wherein a set of media content items inserted into the queue of ordered media content items to be streamed to the media device includes one or more advertisements that are selected based on the preference profile associated with the user.

20. The method of claim 9, wherein the request that causes the media server to determine a set of media content items based on the preference profile is provided by an operation of a shuffle mode.

* * * * *